United States Patent
Hung et al.

(10) Patent No.: US 11,570,020 B2
(45) Date of Patent: Jan. 31, 2023

(54) COMMUNICATION CONVERTERS OF DRY PUMPS

(71) Applicant: ARCHCYBER TECHNOLOGY CO. LTD., Hsinchu (TW)

(72) Inventors: Chi Tsun Hung, Hsinchu (TW); Jia Siang Gao, Hsinchu (TW)

(73) Assignee: ARCHCYBER TECHNOLOGY CO. LTD., Hsinchu (TW)

( * ) Notice: Subject to any disclaimer, the term of this patent is extended or adjusted under 35 U.S.C. 154(b) by 76 days.

(21) Appl. No.: 17/168,157

(22) Filed: Feb. 4, 2021

(65) Prior Publication Data

US 2022/0247595 A1 Aug. 4, 2022

(51) Int. Cl.
*H04L 12/40* (2006.01)
*H04L 69/08* (2022.01)

(52) U.S. Cl.
CPC ........ *H04L 12/40032* (2013.01); *H04L 69/08* (2013.01); *H04L 2012/40228* (2013.01)

(58) Field of Classification Search
CPC ............... H04L 12/40032; H04L 69/08; H04L 2012/40228; H04L 2012/40221; H04L 2012/40215; H04L 2012/40208
See application file for complete search history.

(56) References Cited

U.S. PATENT DOCUMENTS

| | | | | |
|---|---|---|---|---|
| 6,862,557 B2 * | 3/2005 | Jones | .................... | H01L 22/20 702/187 |
| 7,363,195 B2 * | 4/2008 | Yetter, Jr. | ........... | G05B 23/0254 702/183 |
| 2003/0004601 A1 * | 1/2003 | Baek | ........................ | G06F 8/71 700/121 |
| 2005/0159899 A1 * | 7/2005 | Komiyama | ......... | C23C 16/4412 702/24 |
| 2005/0198392 A1 * | 9/2005 | Yu | ........................... | H04L 67/02 709/246 |
| 2005/0228529 A1 * | 10/2005 | Lev-Ami | ........... | G05B 23/0221 700/121 |
| 2006/0259259 A1 * | 11/2006 | Rozenboim | ........ | G05B 19/4184 702/83 |

(Continued)

FOREIGN PATENT DOCUMENTS

| | | | | |
|---|---|---|---|---|
| CN | 110995709 A | * | 4/2020 | ............. H04L 69/08 |
| CN | 112505246 A | * | 3/2021 | |

*Primary Examiner* — Shah M Rahman
(74) *Attorney, Agent, or Firm* — Lin & Associates Intellectual Property, Inc.

(57) ABSTRACT

Provided is a communication converter of a dry pump, including: a first communication module, a memory module, a second communication module, and a processing module. The first communication module receives a sensor data packet from a communication port of the dry pump. The memory module has stored a program that can interpret the sensor data packet, an access address and an identification code of a sensor data. The second communication module is connected to a monitoring host via a first network. The processing module interprets the sensor data packet to retrieve the sensor data, transcodes a coding of the sensor data according to a Modbus protocol, and compiles the transcoded sensor data to generate a data packet of SECS/GEM protocol. The second communication module transmits the data packet of SECS/GEM protocol to the monitoring host.

7 Claims, 5 Drawing Sheets

(56) References Cited

U.S. PATENT DOCUMENTS

| | | | |
|---|---|---|---|
| 2007/0010905 A1* | 1/2007 | Chou | H04Q 3/54591 700/121 |
| 2007/0157804 A1* | 7/2007 | McManus | F17C 11/00 95/114 |
| 2007/0260410 A1* | 11/2007 | Raymond | G05B 23/0264 702/81 |
| 2009/0024689 A1* | 1/2009 | Kim | H04L 67/565 709/202 |
| 2009/0035151 A1* | 2/2009 | Sugiura | F04C 25/02 700/282 |
| 2010/0063614 A1* | 3/2010 | Rosenboim | G05B 19/4184 700/121 |
| 2011/0035043 A1* | 2/2011 | Liu | H01L 21/67253 700/121 |
| 2015/0260192 A1* | 9/2015 | Iwasaki | B01D 53/323 415/183 |
| 2017/0323803 A1* | 11/2017 | van Schravendijk | C23C 16/325 |
| 2018/0164786 A1* | 6/2018 | Shimizu | H04L 67/12 |

* cited by examiner

COMMUNICATION CONVERTERS OF DRY PUMPS

BACKGROUND OF THE INVENTION

1. Field of the Invention

The present application relates to a communication converter, and particularly to a communication converter of a dry pump.

2. The Prior Arts

A large number of dry pumps are used in the semiconductor manufacturing process. Insufficient performance or failure of the dry pumps can cause defects in the wafers during processing, which increases manufacturing costs and causes delays in delivery and safety incidents. FIG. 1 is a block diagram of a current dry pump monitoring system. As shown in FIG. 1, the dry pump monitoring system 1 includes: a plurality of the dry pumps 10, a plurality of input/output gateways (JOG) 11, a Ring Hub 12, a supervisory control and data acquisition (SCADA) server 13, a historical database 14, a transcoding computer device 15, and a fault detection and classification (FDC) server 16. Each input/output gateways 11 is connected to several dry pumps 10 in series, the ring hub 12 is connected to all the input/output gateways 11 and the SCADA server 13, the SCADA server 13 is connected to the historical database 14, and the transcoding computing device 15 is connected to the historical database 14 and the FDC server 16 respectively via a network.

Since each dry pump manufacturer defines the coding format of their sensor data individually, a common communication protocol has not been used to encode the sensor data of the dry pumps 10, and the network communication of the semiconductor factory adopts SEMI Equipment Communication Standard/Generic Equipment Model (SECS/GEM), the SCADA server 13 receives the sensor data of the plurality of the dry pumps 10 from the ring hub 12, and stores the sensor data of different formats in the historical database 14; the semiconductor manufacturers need to further set up the transcoding computer 15 to translate the sensor data of different encoding formats into the sensor data of SECS/GEM encoding format in the historical database 14, and then stores the sensor data of SECS/GEM encoding format in the database of the transcoding computer 15 for the FDC server to read and monitor the stored the sensor data.

The existing dry pump monitoring system is a 1:N architecture, each SCADA server usually collects the sensor data of hundreds to thousands of the dry pumps. As there is delay between a time of the sensor of each dry pump generating the sensor data and a time of the SCADA server receiving the sensor data from the ring hub, and the sensor data needs to be transcoded multiple times, the FDC server needs to correct the delay before using the sensor data of the dry pump during operation. Therefore, the existing dry pump monitoring system cannot truly achieve the function of real-time monitoring. Furthermore, if a data transmission collision or an error occurs with the SCADA server, part of or even all of the sensor data could be lost, thus forming a gap in the monitoring system. There are demands for those skilled in the art to solve the various problems in the existing dry pump monitoring system and to build a communication converter that can transmit the sensor data of different brands of dry pumps to the monitoring or control system accurately in real time.

SUMMARY OF THE INVENTION

To achieve the aforementioned aspects, this application presents a communication converter of a dry pump, which includes: a first communication module, a memory module, a second communication module and a processing module. The first communication module is connected to a communication port of the dry pump in a one-to-one configuration, and receives a sensor data packet from the communication port. The memory module has stored a program that can interpret the sensor data packet, and access address and identification code of the sensor data. The second communication module is connected to a monitoring host via a first network. The processing module is respectively connected to the first communication module, the memory module and the second communication module. The processing module interprets the sensor data packet to retrieve the sensor data, transcodes a coding of the sensor data according to the Modbus protocol, and stores the transcoded sensor data at access address in the memory module. When the monitoring host transmits a query message including the identification code to the second communication module, the processing module reads the transcoded sensor data from the access address, compiles the identification code and the converted sensor data to generate a data packet of the SECS/GEM protocol; and then the second communication module transmits the data packet of SECS/GEM protocol to the monitoring host.

In an embodiment, the processing module generates a query command, the first communication module transmits the query command to the communication port of the dry pump, and the dry pump generates the sensor data packet according to the query command.

In an embodiment, the memory module has stored a network resource address, and the query message of the monitoring host includes the network resource address.

In an embodiment, the coding of the sensor data is binary, and the processing module transcodes the sensor data to hexadecimal.

In an embodiment, the data packet of SECS/GEM protocol includes positive and negative values and decimal places of the transcoded sensor data.

In an embodiment, the second communication module is connected to a data collection host via a second network, when the data collection host transmits a-data request to the second communication module, the processing module reads the transcoded sensor data from the access address, and encodes the transcoded sensor data to generate a data packet of Modbus TCP; and the second communication module transmits a data packet of Modbus TCP to the data collection host.

In an embodiment, the second communication module is connected to a cloud server via a third network, when the cloud server transmits a subscription message to the second communication module, the processing module reads the transcoded sensor data from the access address and encodes the transcoded sensor data to generate a data packet of Message Queuing Telemetry Transport (MQTT) protocol; and the second communication module transmits the data packet of MQTT protocol to the cloud server.

In an embodiment, the memory module has further stored an abnormal range of the sensor data, when the processing module determines that the transcoded sensor data falls within the abnormal range, the processing module generates a notification message of MQTT protocol; and the second communication module transmits the notification message of MQTT protocol to the cloud server.

In the present application, the communication converter of the dry pump includes: a first communication module, a memory module, a second communication module and a processing module. The first communication module receives a sensor data packet from a communication port of the dry pump. The memory module has stored various programs that can interpret different sensor data packets of the dry pumps. The processing module encodes the sensor data in different coding formats to the sensor data of Modbus protocol, and compiles the sensor data of Modbus protocol into the sensor data packets of different communication protocols, such as SECS/GEM, Modbus TCP, MQTT etc., corresponding to demands of monitoring, collecting and others. The second communication module can instantly transmit the sensor data packets to the monitoring host, the data collection host and/or the cloud server. The monitoring host, the data collection host and/or the cloud server do not need to transcode the data again, and can directly use the sensor data to achieve accurate real-time monitoring.

DETAILED DESCRIPTION OF THE PREFERRED EMBODIMENTS

The technical features and other advantages of the present application will become more readily apparent to those ordinarily skilled in the art, by referring to the following detailed description of examples of the present application in conjunction with the accompanying drawings.

Figure 1:
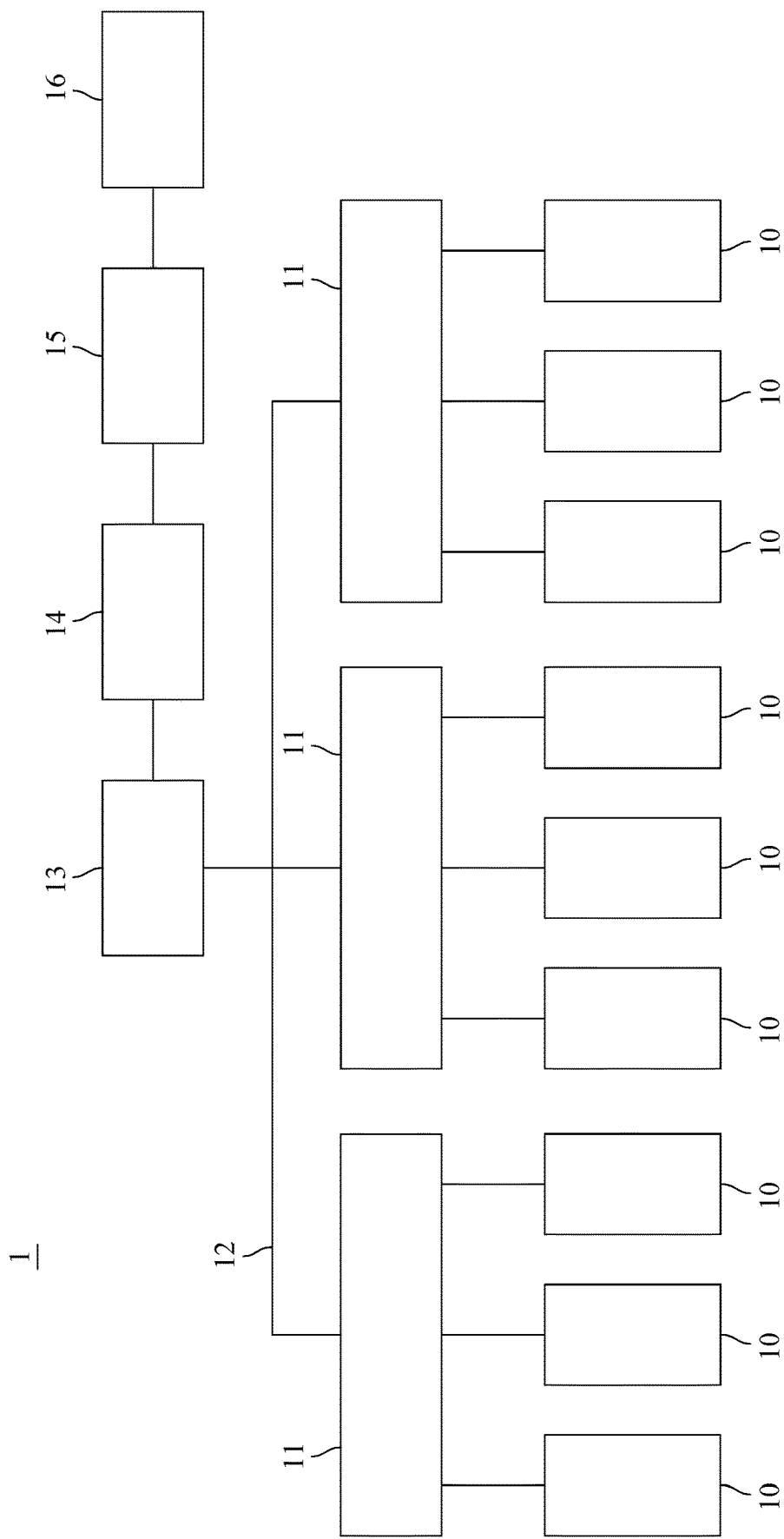
FIG. 1 is a block diagram of an existing dry pump monitoring system.
Figure 2:
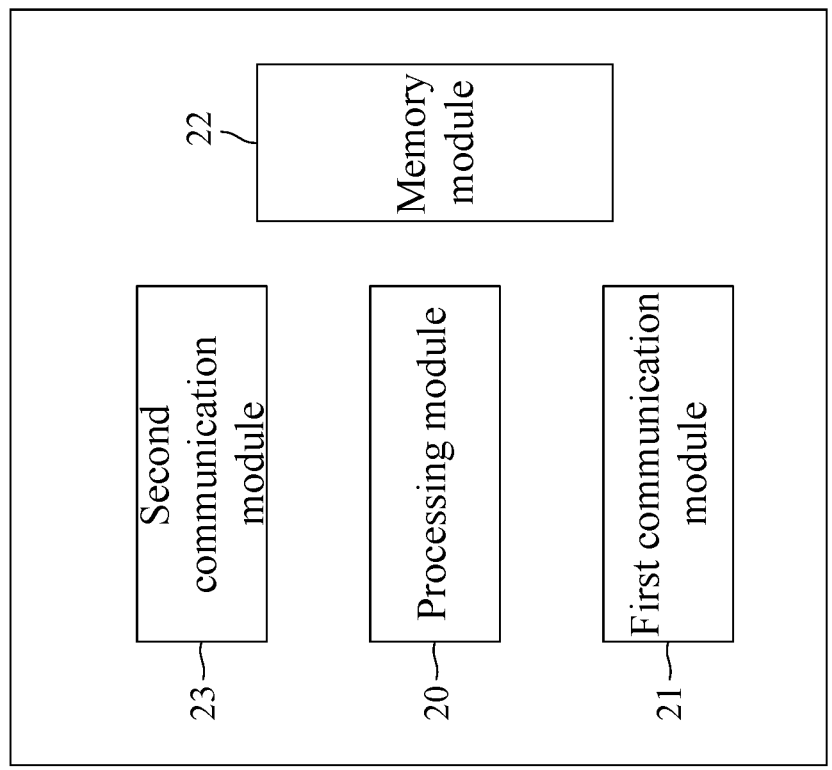
FIG. 2 is a block diagram of a communication converter of a dry pump according to the present application.

FIG. 2 is a block diagram of a communication converter of a dry pump according to the present application. As shown in FIG. 2, a communication converter 2 of the dry pump includes: a first communication module 21, a memory module 22, a second communication module 23 and a processing module 20. The processing module 20 is respectively connected to the first communication module 21, the memory module 22 and the second communication module 23. Specifically, the processing module 20 is a chip including a central processing unit, a dynamic random access memory and peripheral circuits. The first communication module 21 is a communication circuit including a device signal port (for example: RS-232/422/485). The memory module 22 is constructed using flash memory, which stores the operating system (OS), a variety of communication protocol compilers and the communication converting application of the present application. The second communication module 23 is a communication circuit including the local network port (for example: RJ45).

Figure 3:
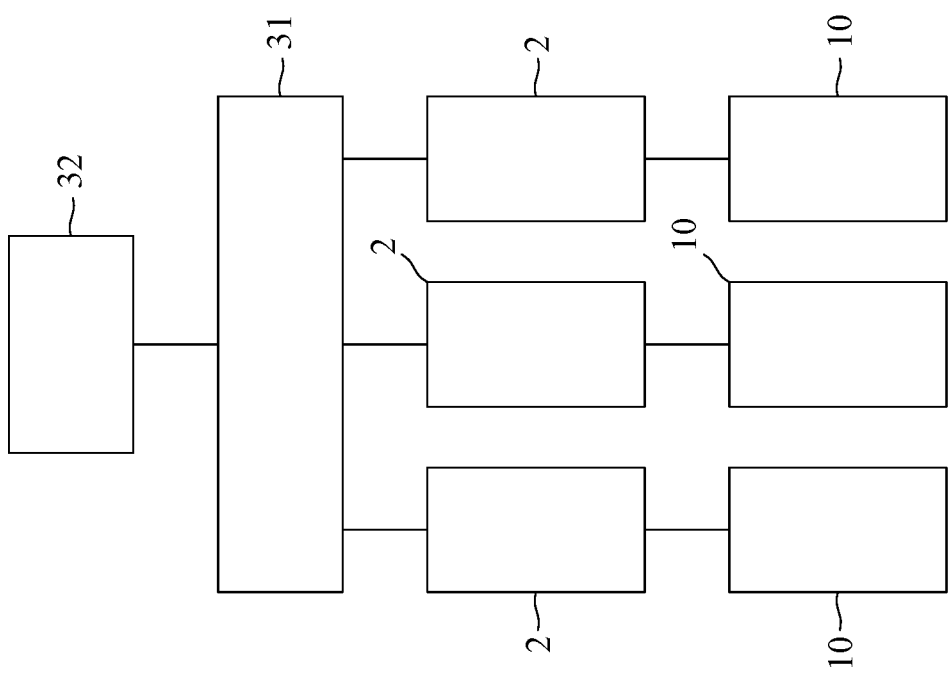
FIG. 3 is a block diagram of a dry pump monitoring system using the communication converter of the present application.

FIG. 3 is a block diagram of a dry pump monitoring system using the communication converter of the present application. As shown in FIGS. 2 and 3, the dry pump monitoring system 3 includes a plurality of the communication converters 2 and the dry pumps 10 in one-to-one configuration, a router 31 and a FDC server 32, the first communication module 21 of each communication converter 2 is respectively connected to the communication port of the dry pump 10, and the router 31 is respectively connected to the second communication module 23 of each communication converter 2 and the FDC server 32. All the communication converters 2 and the router 31 and the FDC server 32 constitute a local network system. The communication converter 2 provides network resource addresses in IPv4 and IPv6. The user can use a user interface (UI) of the processing module 20 to set the IP address (for example: 192.168.1.xx) through a remote connection to the communication converter 2, and stores the IP address of each communication converter 2 in the router 31.

The memory module 22 has stored drivers corresponding to the dry pumps 10 of different brands, programs that can interpret the sensor data packet of the dry pumps, and an access address of the Modbus protocol corresponding to the sensor data and the identification code according to SECS/GEM communication standard (including state variable identification code SVID, event variable identification code CEID, etc.). Through a remote connection to the communication converter 2, the user can set the data type (for example: temperature, pressure, rotation speed, etc.) and the frequency (for example: several times per second to one time every few seconds) that the processing module 20 queries the sensor data of the dry pump 10. The first communication module 21 transmits the command of querying the sensor data to the dry pump 10, and the first communication module 21 receives the sensor data packet from the communication port of the dry pump 10. The following exemplary embodiments are the dry pumps 10 of three brands (Edwards, Ebara, and Kashiyama) used by existing semiconductor factories, the coding formats of the inquiry commands sent by and the sensor data packets received by the communication converter 2 are shown in Tables 1 to 3.

TABLE 1

| The dry pump of Edwards | | | | |
|---|---|---|---|---|
| (Send) Query command code | 1 byte Inquiry requirement | 1 byte Value type | 1 byte Parameter value | 1 byte End code |
| (Receive) Sensor data packet code | 3 bytes Parameter data (sensor data) | | 2 bytes End code | |

(sensor data), and stores the transcoded sensor data in the memory module 22 according to the type of sensor data and access address defined by the Modbus protocol (the holding registers include: Coil, discrete input, save register and input register).

TABLE 2

| The dry pump of Ebara | | | | | | |
|---|---|---|---|---|---|---|
| (Send) Query command code | 1 byte Start code | 3 bytes Command code | 8 bytes Require value | 1 byte Command end code | 2 bytes Check | 1 byte Packet end code |

TABLE 2-continued

The dry pump of Ebara

| (Receive) Sensor data packet code | 1 byte Start code | 2 bytes Data code | 7 bytes Data | 1 byte Data end code | 2 bytes Check | 1 byte Datagram end code |
|---|---|---|---|---|---|---|
| | 1 byte Start code | 2 bytes Data code | 7 bytes Data | 1 byte Data end code | 2 bytes Check | 1 byte Datagram end code |
| | . . . | | | | | |
| (According to number of sub-packets) | | | | | | |
| | 1 byte Start code | 3 bytes Command end code | 1 byte Data end code | 2 bytes Check | 1 byte Packet end code | |

The processing module 20 retrieves 7 bytes binary data from each sub-packet, sequentially encodes the 7 bytes binary data into 2 byte hexadecimal data (sensor data), and stores the transcoded sensor data in the memory module 22 according to the type of sensor data and access address defined by the Modbus protocol.

TABLE 3

Kashiyama dry pump

| (Send) Query command code | 1 byte Start code | 1 byte Function code | 2 bytes Check | | 2 bytes End code | |
|---|---|---|---|---|---|---|
| (Receive) Sensor data packet code | 1 byte Start code | 1 byte Response code | 1 byte Function code | 100 bytes Sensor data | 2 bytes Check | 2 bytes Packet end code |

The processing module 20 retrieves 100 bytes binary sensor data (every 4 bytes represents one value or text) from the sensor data packet, sequentially encodes the binary data into hexadecimal data and text (sensor data), and stores the transcoded sensor data in the memory module 22 according to the type of sensor data and the access address defined by the Modbus protocol.

The programs that can interpret the sensor data packets stored in the memory module 22 are not limited to the aforesaid three brands. If the communication converter 2 is to be used with dry pumps 10 of different brands, different drivers and different data encoding formats from the aforesaid three brands, the user can add additional drivers and encoding formats of the data packet of the dry pumps 10 through the user interface of the communication converter 2.

The communication between the communication converter 2 and the FDC server 32 adopts SECS/GEM protocol, and the FDC server 32 serves as a monitoring host for SECS/GEM communication. When the FDC server 32 transmits the query message including the identification code of the sensor data (for example: the state variable identification code SVID or the event variable identification code CEID) and the IP address to the second communication module 23 of the communication converter 2 of the IP address via the router 31, the processing module 20 reads the transcoded sensor data from the access address, compiles the identification code and the transcoded sensor data according to SECS/GEM protocol to generate the sensor data packet of SECS/GEM protocol, and then the second communication module 23 transmits the sensor data packet of SECS/GEM protocol to the FDC server 32. Since the query message of the FDC server 32 includes the IP address of the communication converter 2, the other communication converters 2 can be prevented from transmitting sensor data packets, thereby the problems of transmission collisions or loss of sensor data can be alleviated.

It is noted that the Modbus protocol does not define the format of positive and negative value and decimal point of the sensor data. The user can set the format of the sensor data packet of the SECS/GEM communication protocol, and the positive and negative value and decimal point of the sensor data through the user interface of the processing module 20. The interface of setting the status variable ID packet of the SEC/GEM protocol is shown in Table 4.

TABLE 4

| | | Access address | | |
|---|---|---|---|---|
| SVID | Area | Address | Data type | Scale |
| 1200001011 | Holding Registers(4XXXXXX) | 0 | (02)_1_Short | (Edit) |
| 1200001001 | Holding Registers(4XXXXXX) | 5 | (02)_1_Short | (Edit) |
| 1200001010 | Holding Registers(4XXXXXX) | 10 | (02)_1_Short | (Edit) |
| 1200001004 | Holding Registers(4XXXXXX) | 15 | (02)_1_Short | (Edit) |

In Table 4, the positive and negative value can be set in the field "Data Type" (the bits of the sensor data are equally divided into half of little-endian bits and half of big-endian bits, the little-endian bits represent the positive value, and the big-endian bits represent the negative value); the decimal point can be determines in the field "Scale" (the value of Modbus format divided by $10^N$). Thereby, the monitoring program of the FDC server 32 can directly use the sensor data transmitted by the second communication module 23 to analyze the status of the dry pump 10 without transcoding, so as to achieve real-time monitoring.

A master-slave architecture is usually adopted in the SECS/GEM protocol, and the equipment receives the query message from the host, and then returns the sensor data packet according to the query message. In case of specific equipment abnormalities, even if the monitoring host can detect the abnormality immediately, the raw materials and products on the production line have likely been damaged already, and high losses may be caused. For early warning of abnormality, the user can set the pre-alarm conditions (Pre ALARM) and notification message (ALID) of the SECS/GEM protocol through the user interface of the processing module 20. When the processing module 20 determines that the sensor data of the dry pump 10 falls within the abnormal range (for example, the pressure value exceeds the vacuum range), the processing module 20 generates a notification message (for example: abnormal pressure), and the second communication module 23 actively transmits the notification message to the FDC server 32 to notify the monitoring personnel to handle abnormalities quickly to avoid damage to raw materials and products.

Figure 4:
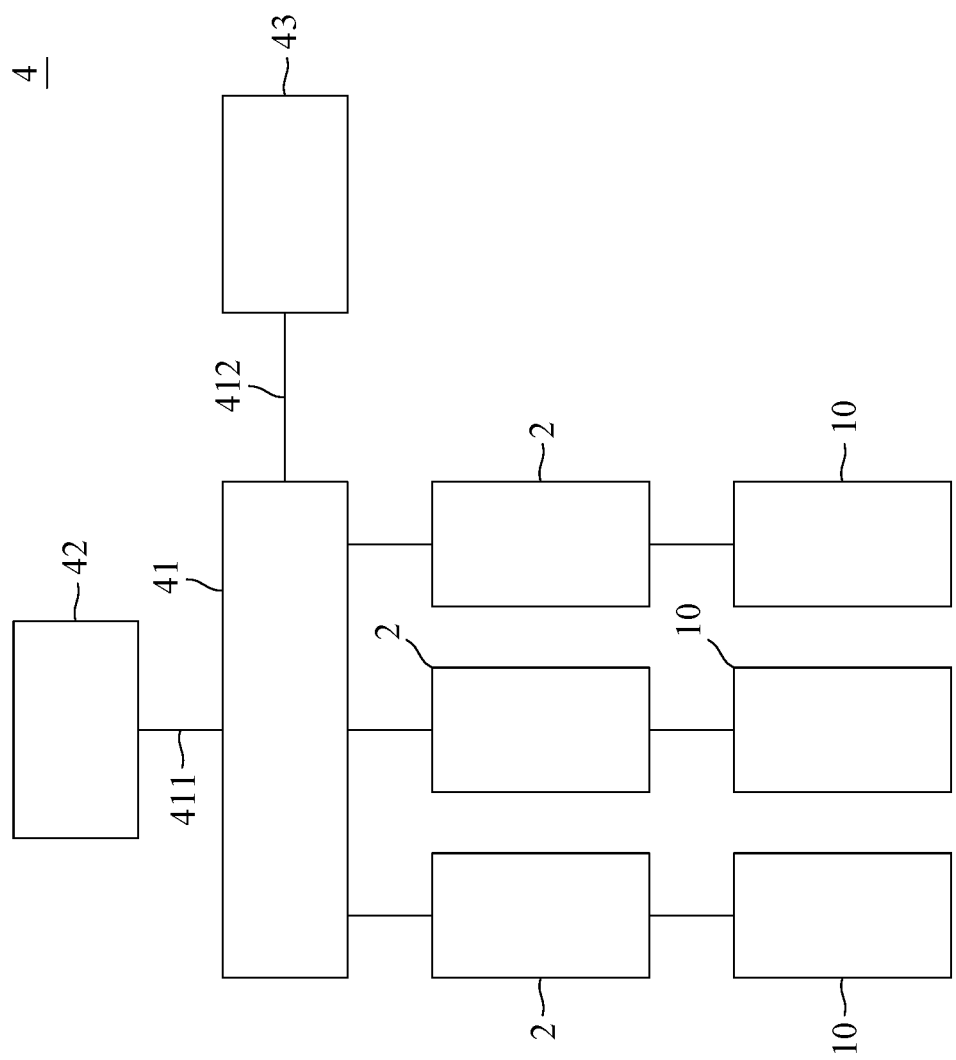
FIG. 4 is a block diagram of another dry pump monitoring system using the communication converter of the present application.

FIG. 4 is a block diagram of another dry pump monitoring system using the communication converter of the present application. As shown in FIGS. 2 and 4, the dry pump monitoring system 4 includes a plurality of the communication converters 2 and the dry pumps 10 in one-to-one configuration, the router 41, the FDC server 42, and the SCADA server 43, and the first communication module 21 of each communication converter 2 is connected to the communication port of the dry pump 10, the second communication module 23 is connected to the router 41, and the router 41 is connected to the FDC server 42 and the SCADA server 43 via the first network 411 and the second network 412 respectively.

All of the communication converters 2, the router 41 and the SCADA server 43 constitute a local area network system. The communication between the communication converter 2 and the SCADA server 43 adopts Modbus TCP of master-slave architecture, and the SCADA server is used as the data collection host in Modbus TCP communication. When the SCADA server 43 transmits data request including the IP address of the communication converter 2 and the access address of the sensor data to the second communication module 23, the processing module 20 reads the transcoded sensor data from the access address of the memory module 22, and compiles the transcoded sensor data according to Modbus TCP to generate a sensor data packet of Modbus TCP. The second communication module 23 transmits the sensor data packet of the Modbus TCP communication protocol to the SCADA server 43, and the SCADA server 43 stores the sensor data packet of the Modbus TCP in a historical database (not shown). No matter whether the FDC server 42 transmits the query message to the communication converter 2, the SCADA server 43 can collect and store the sensor data of all the dry pumps 10 in real time for the FDC server 42 or other work hosts to track the operating status of all the dry pumps 10, so as to achieve complete and accurate monitoring, and the problems of transmission collision or loss of sensor data can be effectively alleviated.

Figure 5:
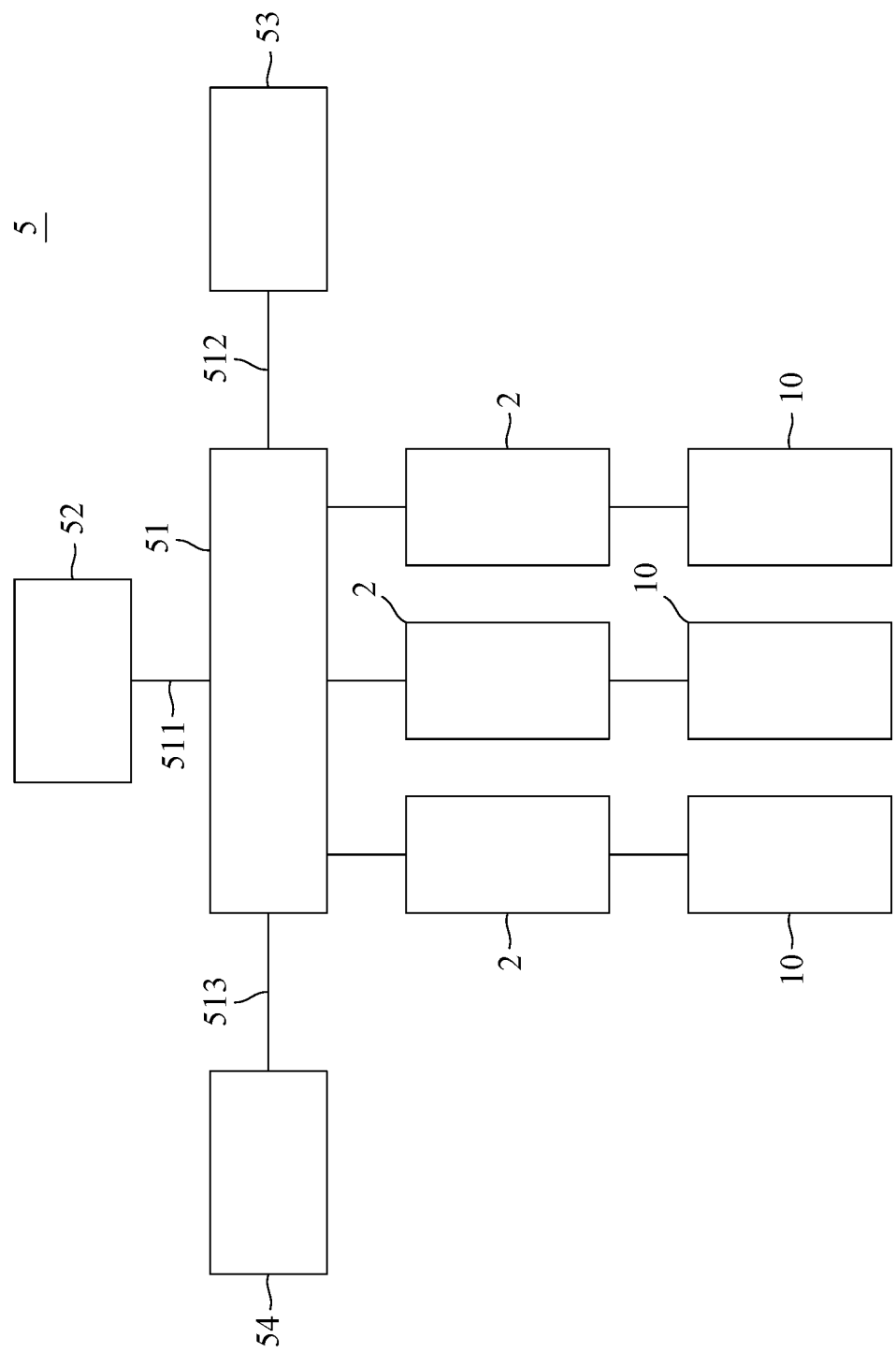
FIG. 5 is a block diagram of another dry pump monitoring system using the communication converter of the present application.

FIG. 5 is a block diagram of another dry pump monitoring system using the communication converter of the present application. As shown in FIGS. 2 and 5, the dry pump monitoring system 5 includes a plurality of the communication converters 2 and the dry pumps 10 in one-to-one configuration, the router 51, the FDC server 52, and the SCADA server 53 and the cloud server 54, the first communication module 21 of each communication converter 2 is connected to the communication port of the dry pump 10, the second communication module 23 is connected to the router 51, and the router 51 is connected to the FDC server 52, the SCADA server 53 and the cloud server 54 via the first network 511, the second network 512 and the third network 513 respectively.

All of the communication converters 2, the router 51 and the cloud server 54 constitute a local area network system that can be connected to Internet. The communication between the communication converter 2 and the cloud server 54 adopts MQTT protocol of Broker-Client architecture, and the cloud server 54 can be connected to Internet to construct industrial internet of things (IIoT). When the cloud server 54 transmits the subscription message including the IP address of the communication converter 2 and data subject to the second communication module 23, the processing module 20 reads the transcoded sensor data from the access address, and compiles the transcoded sensor data according to the MQTT protocol to generate a sensor data packet of the MQTT protocol. The second communication module 23 transmits the sensor data packet of the MQTT protocol to the cloud server 54, so as to establish a web-monitoring platform for the processing equipment.

The MQTT protocol adopts master-slave communication, and the communication converter 2 passively responds to the collection information of the SCADA server 53. In this embodiment, the memory modules 22 of the communication converters 2 have further stored the abnormal range of the sensor data (for example: over pressure, over current, over high or low pump speed, etc.). When the processing module 20 determines that the sensor data falls within the abnormal range (for example, the pressure value exceeds the vacuum range), the processing module 20 generates a notification message of the MQTT (e.g. pressure abnormality), and the second communication module 23 transmits the notification message of the MQTT to the cloud server 54, so as to form a dry pump monitoring system having active notification.

In summary, the communication converter is in a one-to-one connection to the dry pump according to the present application, the first communication module receives a sensor data packet of the dry pump; the memory module has stored various programs that can interpret a sensor data packet of the dry pump; the processing module encodes the sensor data of different coding formats to the sensor data of Modbus protocol, and compiles the sensor data into the sensor data packets of different communication protocols, such as SECS/GEM, Modbus TCP, MQTT, etc., corresponding to the demands of monitoring, collecting and others; The second communication module can instantly transmit the sensor data packets to the monitoring host, the data collection host and/or the cloud server; the monitoring host, the data collection host and/or the cloud server do not need transcoding again, and can directly use the sensor data to achieve real-time and accurate monitoring.

The above-mentioned embodiments only exemplarily illustrate the principle and effects of the present application, and are not used to limit the present application. Those skilled in the field can modify and change the above-mentioned examples without departing from the spirit and scope of the present application. Therefore, all equivalent modifications or changes made by those skilled in the technical field without departing from the spirit and technical principles disclosed in the present application should still be covered by the scope of the present application.

What is claimed is:

1. A communication converter of a dry pump, comprising:
   a first communication module connected to a communication port of the dry pump in one-to-one configuration, and receiving a sensor data packet from the communication port;
   a memory module having stored a program that can interpret the sensor data packet, an access address and an identification code corresponding to a sensor data;
   a second communication module connected to a monitoring host via a first network; and
   a processing module respectively connected to the first communication module, the memory module and the second communication module, interpreting the sensor data packet to retrieve the sensor data, transcoding a coding of the sensor data according to a Modbus protocol, and storing the transcoded sensor data in the access address of the memory module;
   wherein when the monitoring host transmits a query message including the identification code to the second communication module, the processing module reads the transcoded sensor data from the access address, compiles the identification code and the transcoded sensor data to generate a data packet of SEMI Equipment Communication Standard/Generic Equipment Model (SECS/GEM) protocol, the second communication module transmits the data packet of SECS/GEM protocol to the monitoring host, and the data packet of SECS/GEM protocol includes positive and negative values and decimal places of the transcoded sensor data.

2. The communication converter of the dry pump according to claim 1, wherein the processing module generates a query command, the first communication module transmits the query command to the communication port of the dry pump, and the dry pump generates the sensor data packet according to the query command.

3. The communication converter of the dry pump according to claim 1, wherein the memory module has stored a network resource address, and the query message of the monitoring host includes the network resource address.

4. The communication converter of the dry pump according to claim 1, wherein the coding of the sensor data is binary, and the processing module transcodes the coding of the sensor data to hexadecimal.

5. The communication converter of the dry pump according to claim 1, wherein the second communication module is connected to a data collection host via a second network, when the data collection host transmits a data request to the second communication module, the processing module reads the transcoded sensor data from the access address, and compiles the transcoded sensor data to generate a data packet of Modbus TCP; and the second communication module transmits the data packet of the Modbus TCP to the data collection host.

6. The communication converter of the dry pump according to claim 1, wherein the second communication module is connected to a cloud server via a third network, when the cloud server transmits a subscription message to the second communication module, the processing module reads the transcoded sensor data from the access address and compiles the converted sensor data to generate a data packet of Message Queuing Telemetry Transport (MQTT) protocol; and the second communication module transmits the data packet of MQTT protocol to the cloud server.

7. The communication converter of the dry pump according to claim 6, wherein the memory module has further stored an abnormal range of the sensor data, when the processing module determines that the transcoded sensor data falls within the abnormal range, the processing module generates a notification message of MQTT protocol; and the second communication module transmits the notification message of MQTT protocol to the cloud server.

* * * * *